May 29, 1951 — R. H. VARIAN — 2,554,512

ACCELEROMETER

Filed May 28, 1946 — 3 Sheets-Sheet 1

INVENTOR
RUSSELL H. VARIAN
BY
ATTORNEY.

May 29, 1951 R. H. VARIAN 2,554,512
ACCELEROMETER

Filed May 28, 1946 3 Sheets-Sheet 2

INVENTOR
RUSSELL H. VARIAN
BY Herbert N. Thompson
his ATTORNEY.

May 29, 1951  R. H. VARIAN  2,554,512
ACCELEROMETER
Filed May 28, 1946  3 Sheets-Sheet 3

INVENTOR
RUSSELL H. VARIAN
BY Herbert N. Thompson
his ATTORNEY.

Patented May 29, 1951

2,554,512

UNITED STATES PATENT OFFICE 2,554,512

ACCELEROMETER

Russell H. Varian, Garden City, N. Y., assignor to The Sperry Corporation, a corporation of Delaware Application May 28, 1946, Serial No. 672,889

22 Claims. (Cl. 175—183)

My invention particularly relates to accelerometers which are primarily adapted to detect and measure angular accelerations, or for detecting variations in attitude of a member, such as a craft on which the accelerometer is mounted, relative to gravity or apparent gravity, and also to accelerometers capable of measuring variations in the value of the acceleration force due to gravity.

The present invention will be described, mainly for exemplary purposes, as embodying a particular type of acceleration sensitive device which will hereinafter be particularly described, and the present invention preferably embodies the above referred to acceleration-sensitive device because of its compactness, simplicity of construction, high sensitivity to acceleration forces and its adaptability to comparatively rapid rotary, oscillatory or vibratory movements of the character contemplated in the present invention. However, I do not wish the present invention, in its broader aspects, to be necessarily limited to the type of acceleration-sensitive elements herein described, and other suitable acceleration-sensitive elements or devices may be employed. The acceleration-sensitive elements which I prefer to employ and which because of their unique properties, above pointed out, render the accelerometers of the present invention of a practical nature are of fairly recent origin. Such acceleration-sensitive elements comprise a closed envelope containing therewithin a filament or wire-like element of electrically conducting material and one preferably having a high temperature coefficient of resistivity. The envelope also contains a fluid, preferably a gas, exhibiting sufficient inertia as appreciably to vary the resistance of the filament when subjected to acceleration forces. A detailed disclosure of this type of acceleration-sensitive element appears in application Serial No. 492,771 which was filed in the U. S. Patent Office on or about June 29, 1943 in the name of Hugh E. Webber, now U. S. Patent No. 2,455,394.

As more specifically pointed out in the above-identified application 492,771, the conducting filament may be formed of tungsten, platinum, such as Wollaston wire, or similar resistive electrical conductors having desirable temperature coefficients of resistivity. In the forms thereof embodying a gas, such gas is preferably one having comparatively high molecular weight such as a gas taken from the inert gas group consisting of helium, neon, argon, krypton and xenon. Nitrogen, being a relatively inert gas, could also be employed, and such rare and inert gases are desirable not only because of their inertness, thereby prolonging the life of the resistance element or filament, but also because of the relatively high molecular weights of some or most thereof. Combinations of these gases may, of course, be used, and combinations thereof with lighter gases may be employed to increase the thermal conductivity of the gaseous medium.

One of these acceleration-sensitive elements or a pair thereof may be connected in a balancing or bridge-like circuit which will become unbalanced when unequally affected by an acceleration force. When one of these devices is embodied in one of the arms of a bridge circuit, it will be sensitive to the absolute value of all acceleration forces to which it is subjected. That is to say, it will be continuously subjected to the acceleration force of gravity and to the vector sum of this acceleration force and all lateral or translational accelerations including rotational accelerations.

The sensitivity of such an element to acceleration forces is occasioned by the convection stream produced in the gaseous medium surrounding the wire-like filament when it is heated by the flow of an electric current therethrough. In other words, assuming that the acceleration-sensitive element is subjected to no acceleration forces whatsoever except that due to gravity, the heated wire will cause a convection current to pass upwardly from the surface of the wire to the upper part of the enclosing casing, whereupon the convection stream will cascade downwardly on both sides of the casing toward the bottom thereof and thence pass inwardly and rise toward the heated filament. Under these conditions, the resistance of the filament is substantially a constant since its temperature remains a constant because of substantially a uniform rate of heat removal through convection in the gaseous medium. If the device is so disposed that the filament lies in a horizontal plane, it will be readily seen that a maximum rate of cooling of the filament will result under the above conditions, since the upwardly rising convection streams will lie substantially normal to the filament and therefore under these conditions, the resistance of the filament will be a minimum. As the device is rotated from a horizontal position of the filament toward a vertical position thereof, the angle between the rising convection stream and the wire will become progressively smaller, the rate of heat conduction from the wire becoming less with a resulting increase in its resistance. When the filament or wire lies vertically, it will have maximum resistance because the heat liberated from the lower portions of the wire will pass upwardly along or adjacent the surface of the wire, thereby increasing the temperature of the upper regions of the wire and producing maximum resistance.

It will be noted that the driving force of the convection stream of gas previously discussed is proportional to the difference in buoyancy of the heated gas adjacent the wire, and the cool gas near the walls of the envelope. A little reflection will disclose the fact that the phenomenon of buoyancy is the result of the force of gravity (or any other acceleration) acting on a mass suspended in a fluid and upon the suspending fluid. Without acceleration there would be no buoyant force and hence no convection. The velocity of the convection is therefore a function of the vector sum of all accelerations acting, including the acceleration of gravity. Normally, lateral accelerations are small compared to the acceleration of gravity. Hence, if the device is employed in a manner to detect accelerations in the direction of gravity, its sensitivity will be high because such accelerations will be a first order effect, that is, the resultant acceleration is the algebraic sum of the acceleration due to gravity and the other acceleration force. However, if the other acceleration force is a lateral one or one normal to the direction of the acceleration of gravity, the sensitivity of the device in detecting and measuring the lateral acceleration will be comparatively low, since the resultant change in acceleration is a second order effect or quadratic, being equal to the square root of the sum of the squares of the lateral acceleration and gravitational acceleration.

In the present invention, I propose to employ one or preferably two of the above described acceleration-sensitive elements connected in a balancing or bridge-like circuit and, in the latter event, to so arrange said elements relative to each other that the effects of acceleration forces thereon, which occur in directions other than those in which an acceleration force to be detected occurs, will balance each other thereby rendering the accelerometer sensitive substantially only to the desired acceleration forces to be detected. More particularly, I propose to provide an accelerometer of the foregoing character which will provide an alternating signal voltage output which will have an amplitude dependent upon the magnitude of the acceleration force to be detected and a phase sense which is dependent upon the direction in which the acceleration occurs. A signal voltage of this character or of a sine wave character having a variable phase is admirably suited for use with modern types of servo systems or controls.

The preferred relative arrangement of the acceleration-sensitive elements in the accelerometers of the present invention and the manner in which they function to render the accelerometers sensitive substantially only to accelerations occuring or having components in one or the opposite direction or about a chosen axis will become more apparent from the detailed description of the preferred embodiments of my invention hereinafter set forth.

Broadly speaking, however, it is a primary object of the present invention to provide an accelerometer which is sensitive substantially only to acceleration forces or components thereof occurring vertically or in the direction of gravity.

It is another primary object to provide an accelerometer which is sensitive substantially only to rotational or angular accelerations.

Another primary object resides in providing an accelerometer capable of measuring changes in the value of $g$ or the acceleration of gravity.

Still another primary object resides in providing an accelerometer which functions as an inclinometer to provide a substantially sinusoidal signal voltage output, the amplitude of which is a measure of the degree of inclination and the phase of which is an indication of the direction of the inclination.

More particularly, it is an object of the present invention to provide an accelerometer including one or a plurality, such as a pair, of acceleration-sensitive elements connected in circuit to supply a voltage output varying in accordance with the changes in the value of acceleration forces to which it or they are subjected and wherein the element of the plurality of elements are moved in the same and in an opposite direction to a component of acceleration force to be detected.

Other objects reside in providing an accelerometer of the foregoing character in which the acceleration-sensitive element or the pair thereof are continuously rotated in the same direction to provide a signal voltage output having a magnitude dependent upon the angle of inclination between its axis of rotation and vertical and a phase sense dependent upon the direction of such inclination, the signal output being zero when the direction of gravity and the axis of rotation are coincident; and wherein the sensitive elements are positioned in relatively spaced relation on opposite sides of a chosen axis and oscillated or vibrated to provide a signal voltage output generally of the character above pointed out.

Still other objects reside in providing accelerometers of the foregoing characters which are capable of determining the direction of apparent vertical and which are capable of determining the direction and magnitude of yaw accelerations such as occur in aircraft and other navigable craft about a vertical axis.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

With the foregoing and still other objects in view, my invention includes the novel elements and the correlation and relative arrangements thereof described below and illustrated in the accompanying drawings, in which—

It should be pointed out, at this point, that the term "accelerometer" properly denotes a device which measures a vector quantity. The acceleration-sensitive tube element, per se, herein described, measures intensity only. An angular accelerometer measures a vector quantity but angular accelerations as compared to linear accelerations. An inclinometer provides an indication of direction of tilt. Hence, in the present application, I employ the term "accelerometer" generically to denote any one or all of the various embodiments of the present invention exclusive of the tube element alone, since they operate fundamentally on the principle of responding to acceleration forces and are respectively so arranged as to function in the various manners herein described to provide various types of desired outputs.

Figures 1, 2, 3, 4, 5:
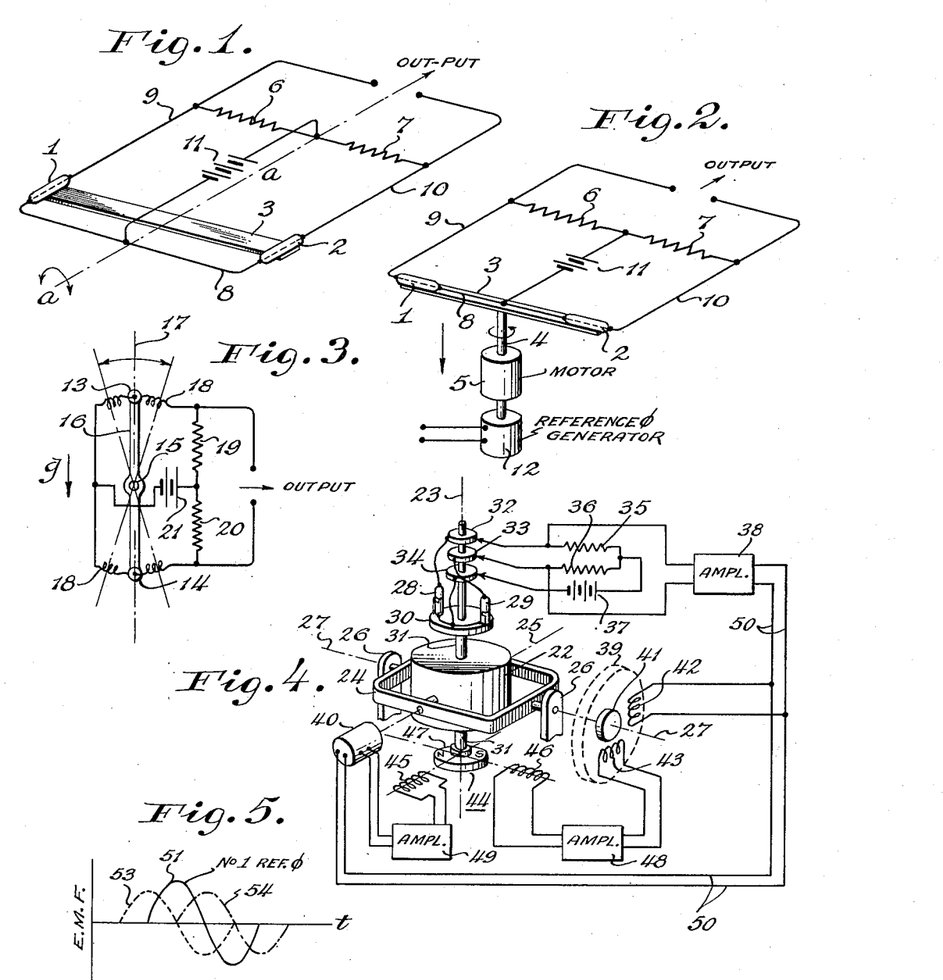
Fig. 1 schematically represents one form of angular accelerometer of the present invention.
Fig. 2 schematically shows a second similar form of accelerometer.
Fig. 3 schematically represents another form of accelerometer.
Fig. 4 is a somewhat diagrammatic perspective view of one form of my invention applied as an inclinometer for detecting tilt and for controlling the erection of a gyro vertical.
Figs. 5 and 6 are curves illustrating the relationship of the phase of the output voltage derived from the inclinometer with relation to reference voltages.

As hereinbefore pointed out, one form of the present invention contemplates providing an accelerometer for detecting angular accelerations only. In Fig. 1, I have schematically shown a simplified angular accelerometer. 1 and 2 each represent generally an acceleration-sensitive element of the character hereinbefore described comprising a tube or casing containing a resistance element and a gas having sufficient inertia as appreciably to vary the resistance of the resistors when subjected to acceleration forces. These elements are mounted in a fixed relatively spaced relation on an arm 3 which represents any member such as a navigable craft or an airplane, the accelerations of which about the axis $a—a$ are to be detected. The elements 1 and 2 are connected in a balancing bridge or bridge-like circuit including resistors 6 and 7, these resistors being connected together in series and in series with the resistors within the elements 1 and 2 by means of conductors 8, 9 and 10 as illustrated. The battery 11 is connected across one diagonal of the bridge as between the conductor 8 and the point of connection between resistors 6 and 7 while the output of the circuit is derived across conductors 9 and 10. A battery is shown as illustrative of one form of excitation of the bridge circuit and of course alternating current may be employed.

The resistors within the elements 1 and 2 are preferably arranged in parallel relation and parallel or normal to the axis $a—a$ about which angular accelerations are to be detected. With this arrangement and assuming the acceleration-sensitive elements 1 and 2 have like characteristics as hereinafter more particularly pointed out, it will be seen that this form of angular accelerometer is relatively insensible to all translational or linear accelerations including, when static, the acceleration of gravity since the effect of such accelerations on both elements will be balanced in the circuit. However, when the elements 1 and 2 are subjected to an angular acceleration or a component thereof about the axis $a—a$ and it is assumed that the axis $a—a$ is generally horizontal or at least that the angular acceleration occuring about said axis gives each accelerometer element a component in the direction of gravity, an unbalance of the bridge will occur by virtue of the fact that the acceleration experienced by one of said elements will be additive to the acceleration of gravity while that experienced by the other will be subtractive from the acceleration of gravity.

In Fig. 2, I have schematically shown a second simplified form of my invention which is generally similar to that shown in Fig. 1 and like reference characters have been applied to corresponding parts. However, in the embodiment of my invention shown in Fig. 2, the arm 3, on which the elements 1 and 2 are mounted in fixed relatively spaced relation, is adapted to be rotated by the shaft 4 of a suitable motor 5 and this embodiment, as hereinafter more specifically described, is adapted for use as an inclinometer.

In accelerometers of these characters, it is desirable to employ two acceleration-sensitive elements, preferably having like characteristics thereby providing no output of the bridge for voltage changes, changes in ambient temperature and the like, and preferably disposed with the wire-like resistors therein, lying in substantially parallel relationship in order that all effects due to lateral or translational accelerations, including the acceleration due to gravity, will balance out. However, where an accelerometer of the foregoing character is employed as an inclinometer or in detecting angular accelerations, the resistors of the acceleration-sensitive elements may be angularly disposed with respect to each other, but preferably arranged at equal angles with the axis of rotation of the accelerometer. For example, where the accelerometer is employed as an inclinometer, the resistors of the sensitive elements should make the same angle with vertical when the axis about which they are rotated coincides with vertical so as to provide a balanced condition of the bridge and therefore zero signal output. With this arrangement, it will be seen that when the axis of rotation of the bridge and the direction of gravity are coincident, both acceleration-sensitive devices when stationary will be equally affected by the acceleration of gravity and also substantially equally by any lateral or other linear accelerations. The accelerometer is therefore relatively insensitive to all such lateral accelerations and provides zero signal output when the axis of rotation and the apparent vertical are coincident. As long as the axis of rotation is in the apparent vertical, the centripetal acceleration of the rotation of the system will always be at right angles to the apparent force of gravity for both accelerometer elements and the bridge will therefore remain balanced. When the axis of rotation departs from the vertical, one acceleration-sensitive element experiences a component of centripetal force in the direction of apparent gravity while the other experiences a component in the opposite direction and the bridge, therefore, experiences a sinusoidal unbalance. Such an arrangement as that shown in Fig. 2 is therefore admirably suited for use as an inclinometer and its axis of rotation 4 may be arranged vertically as illustrated, or the acceleration-sensitive elements may be rotated, for example, about a generally horizontal axis. In the latter case, it will detect tilt of its plane of rotation, the signal output of the bridge being a maximum when the said plane is vertical.

In the present disclosure and drawings, I have described and illustrated various embodiments of my invention wherein the acceleration-sensitive devices or tube-like elements are disposed on opposite sides of a chosen axis such as an axis of rotation, about which angular acceleration forces are to be detected. This relative arrangement of parts is not essential for the sensitivity is the same for any axis of rotation which is perpendicular to the line joining the sensitive elements. However, in accordance with my invention, the acceleration-sensitive devices may be placed on the same side of such axes in which case the distance of each from said axis should differ. In the case where they are disposed on opposite sides of the axis, the radial distances from said axis to each are preferably equal.

When the accelerometer of Fig. 2 is arranged as therein illustrated to rotate about a generally vertical axis, it will be seen that, assuming its axis of rotation and the direction of gravity are coincident, both acceleration-sensitive devices and elements are affected equally by gravity and produce no bridge unbalance. However, as its axis of rotation becomes inclined relative to vertical, the acceleration-sensitive elements during their rotation about the axis 4 will experience movements alternately in the direction of gravity and in the opposite direction. Since the elements lie on the opposite sides of the axis of rotation, their movements will be simultaneously in relatively opposite directions compared to the direction of gravity and they will therefore experience accelerations adding and subtracting from that of gravity. In other words, one element will experience an acceleration adding to gravity while the other will simultaneously experience an acceleration subtracting from gravity. Furthermore, since it may be assumed that these elements are rotated at a constant rate, such rotary movement when the axis of rotation is inclined to the vertical will produce a sinusoidal unbalance of the bridge and therefore a sinusoidal voltage output. Further assuming that the accelerometer is free to tilt in any direction from the vertical, the time phase relation of the sinusoidal voltage output from the bridge will be an indication of the direction in which the tilt has occurred. To determine the direction of tilt, therefore, I propose to drive a reference generator 12 from the motor 5 which will provide a reference voltage of the same frequency as the signal voltage output of the bridge circuit but which will have a fixed time phase relationship.

Hence, by comparing the phase relationship of the voltage output from the bridge circuit with the reference voltage derived from generator 12, we can determine the direction of inclination of the axis of rotation of the accelerometer relative to vertical and the amplitude of the sinusoidal output voltage of the circuit will be a measure of the amount or degree of such inclination.

In Fig. 4, I have shown the adaptation of an accelerometer of the character shown in Fig. 2 to a gyro vertical as an example of one use thereof, but before proceeding with a detailed description thereof, reference should first be had to Fig. 3 illustrating schematically a second embodiment of my accelerometer which may be employed for detecting inclinations relative to vertical, determining the direction in which such inclinations occur about a given axis and measuring the amount thereof.

Referring now to Fig. 3, 13 and 14 represent acceleration sensitive elements of the character of those indicated at 1 and 2 in Fig. 1. In Fig. 3, however, the resistors of the sensitive elements are illustrated as generally paralleling the axis of rotation 15 of the accelerometer. In this form of my invention, the acceleration-sensitive elements are likewise mounted in fixed relatively spaced relation on opposite sides of the axis of movement thereof by means of an arm 16 which is adapted to rotate about the axis 15. In this embodiment of my invention, I propose to oscillate or vibrate the two sensitive elements to equal extents on both sides of a reference axis 17. Suitable means are provided for producing such oscillations, an example of which will be later described in connection with Figs. 7, 9 or 10. Flexible connectors 18 serve to connect the elements 13 and 14 in a balancing bridge-like circuit including resistors 19 and 20. A battery 21 is illustrated as energizing the bridge circuit although, of course, it is to be understood that the bridge circuits of both Figs. 2 and 3 may be energized by alternating current. The bridge circuits shown in both of these figures may be substantially identical and both function in substantially the same manner to provide a sinusoidal signal voltage output. However, the bridge circuit of Fig. 3 should feed into a filter circuit as hereinafter described to eliminate double frequency voltage components.

The operation of the accelerometer or inclinometer of Fig. 3 is as follows. Let us assume that the reference axis 17 of the accelerometer is coincident with apparent vertical. That is, coincident with the vector sum of all acceleration forces to which the acceleration-sensitive elements may become sensitive because of the oscillatory movements thereof, the oscillation of these elements to equal extents on both sides of the axis 17 will produce an unbalance of the bridge circuit at a frequency equal to twice that of the frequency of oscillation of the inclinometer. These double frequency voltages do not, of course, constitute signal voltages which are a measure of the inclination of the reference axis 17 of the accelerometer relative to apparent vertical when inclined about the axis of oscillation 15. Therefore, a filter circuit is preferably connected to the output of the bridge to filter out such double frequency voltage, while passing signal voltages having a frequency equal to that of the frequency of oscillation of the elements. Such a signal voltage will occur when the reference axis 17 becomes inclined about the axis 15 relative to apparent vertical. For example, assume that axis 17 is inclined in a counterclockwise direction in Fig. 3, then the acceleration-sensitive elements 13 and 14 will each experience an acceleration alternately adding to and subtracting from that of gravity at a frequency equal to the frequency of oscillation thereof and the phase sense of the signal voltage so produced which is of the frequency of oscillation of the inclinometer will indicate, when compared with the phase of a reference voltage, that the inclination of reference axis 17 has occurred in a counterclockwise direction. Therefore, any unbalancing of the bridge at the frequency of the oscillation of elements 13 and 14 will be due to inclination of the reference axis 17 of the inclinometer relative to apparent vertical and in the plane of oscillation, and the amplitude of this signal voltage will be a measure of such inclination and its phase sense will be an indication of the direction of such inclination. Particular applications of my accelerometer shown in Fig. 3 will be described in detail in connection with Figs. 7 and 9 and a modified form thereof is shown and described in connection with Fig. 10.

Referring now to Fig. 4, wherein I have illustrated the form of my invention shown in Fig. 2 in its adaptation to control the erection of a gyro vertical, 21 indicates generally the gyro vertical having a rotor bearing case 22 within which a rotor is mounted to spin about the axis 23. The rotor bearing case 22 is mounted on suitable trunnions in the gimbal ring 24 and may rotate about the axis 25 relative to the gimbal ring. The gimbal ring 24 is in turn mounted on trunnions journalled in supports 26 so that the gimbal ring may rotate relative to the supports about an axis 27. Hence, the gyro vertical is mounted to move about two relatively perpendicular axes 25 and 27. In accordance with my invention, I have mounted two acceleration-sensitive elements 28 and 29 which may be generally similar to the elements 1 and 2 shown in Figs. 1 and 2 to rotate about the spin axis 23 of the gyro vertical. For purposes of illustration these elements are shown as mounted on a disc 30 which is secured to the shaft 31 with which the gyro rotor spins. These sensitive elements 28 and 29 are connected in a bridge circuit similar to that shown in Fig. 2 by means of slip rings and brushes 32, 33 and 34, the balancing circuit comprising resistors 35 and 36 and the circuit being energized by the battery 37. The output of the bridge circuit is connected to any conventional type of A. C. amplifier 38 and the output of the amplifier is connected to energize one phase of each of two 2-phase torque motors which are associated with the gyro vertical to control the erection thereof.

In the embodiment herein shown, one torque motor 39 is mounted to exert a torque on the gimbal ring about the axis 27 of support thereof and a second torque motor 40 is mounted to exert a torque on the rotor bearing case about its axis of support 25. The association of these torque motors with the structure of the gyro vertical is shown quite schematically in Fig. 4 in order to provide a clearly understandable illustration.

Torque motor 39 comprises a rotor 41 which is connected to exert a torque on the gimbal ring 24, while its two-phase field comprises the windings 42 and 43 which are mounted in 90° spaced relation and may be secured to the support 26. Similarly, the two-phase torque motor 40 comprises a rotor which is connected to exert a torque on the rotor bearing case 22 and its field windings or stator may be secured on the gimbal ring 24.

The output of amplifier 38 will be an alternating voltage having an amplitude proportional to the degree of inclination of spin axis 23 relative to vertical. In order to determine the time phase relation of this signal voltage so as to determine the direction in which such inclination has occurred, I provide a reference phase generator indicated generally at 44 and comprising the two field windings 45 and 46 which are arranged in 90° spaced relation and a permanent magnet rotor 47 which is also preferably mounted on shaft 31 to spin with the gyro rotor. The reference phase generator will therefore provide two reference voltages time phase-displaced 90° from each other and of a frequency equal to the spin frequency of the acceleration sensitive elements 28 and 29. The reference voltage supplied from winding 46 may be passed through a suitable amplifier 48 and thence to one of the field windings 43 of torque motor 39. Similarly, the output of field winding 45 may be supplied through a suitable A. C. amplifier 49 to one of the field windings of the two-phase torque motor 40. The other phase or field winding of torque motor 40 is connected through conductors 50 to the output of amplifier 38 and the second phase of field winding 42 of torque motor 39 is likewise connected with conductors 50.

An alternative way of obtaining the two reference voltages is to use inductor 46 and amplifier 48, and a 90° phase shifter to produce a reference voltage of the same phase as would be produced by inductor 45 and amplifier 49.

Figure 6:
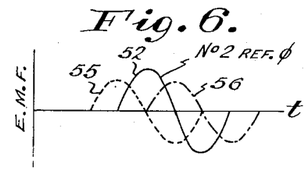

The operation of the above-described adaptation of my inclinometer to a gyro vertical should be apparent from the following taken in connection with Figs. 5 and 6. In Fig. 5, I have shown a reference voltage 51 which is 90° time phase-displaced from the reference voltage 52 illustrated in Fig. 5. These reference voltages are derived respectively from one of the windings 45 or 46 of the reference phase generator 44. Since, the axis of winding 46 is shown as paralleling the axis 27 of the gyro vertical and the axis of winding 45 paralleling the axis 25 of the gyro vertical, the respective reference voltages may be employed to determine the direction of tilt of spin axis 23 about the axis of supports 25 and 27. In the embodiment shown, the phase relation of the output of amplifier 38 with respect to the reference voltage derived from winding 46 will provide an indication of the direction of tilt about the axis of support 25. The phase relation of the output of amplifier 38 with respect to the reference voltage derived from winding 45 will be an indication of the direction of tilt about the supporting axis 27.

Referring again to Fig. 5, if the spin axis 23 tilts about the axis of support 25 of the gyro vertical, the voltage output from amplifier 38 will have the time phase relation represented by the dotted-line voltage curve 53 or that represented by the dot-dash voltage curve 54 depending on its direction of tilt about said axis. The same is true in connection with the voltage curves shown in Fig. 6 for tilt about the other axis. In other words, the output of amplifier 38 will have a phase sense relative to the reference voltage 52 illustrated by the dotted-line voltage curve 55 or the dot-dash voltage curve 56, depending upon the direction of inclination of the spin axis about the axis of support 27 of the gyro vertical. The amplitude of the voltage curves 53—56 will depend upon the degree of inclination or the magnitude of a component of inclination about the respective axes. The phase sense of these voltages represented by curves 53—56 will either lead or lag the reference voltages depending upon the direction of tilt exerted by the torque exerted by the motors controlled thereby will occur in one direction or the other depending upon whether the signal voltages lead or lag the reference voltages, and, of course, the torque motors are so connected that the torque will be exerted in a correct direction to precess the gyro so that its spin axis moves toward zero inclination.

Although I have shown the acceleration-sensitive elements as disposed with the resistors therein generally paralleling the spin axis of the gyro 23, it will be understood that they may be arranged as shown in Fig. 2 or at equal angles to the spin axis, the showing of these elements in the particular arrangement of Fig. 4 being mainly for exemplary purposes.

Figure 7:
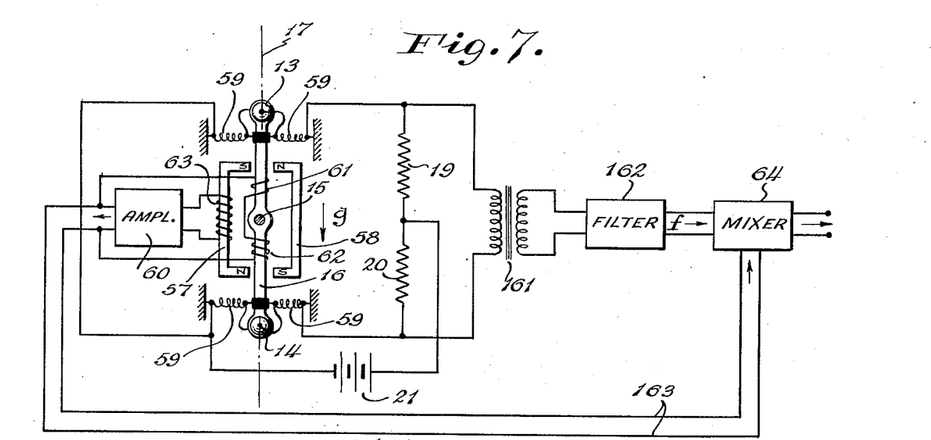
Fig. 7 is a diagrammatic representation of one embodiment of my invention which may be employed to determine the direction of apparent vertical.
Figure 8:
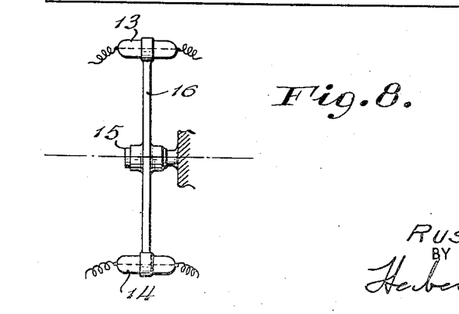
Fig. 8 is a fragmentary schematic view of the supporting arm for the acceleration-sensitive elements of Fig. 7 viewed at right angles to the illustration thereof in Fig. 7.

In Fig. 7, I have shown an accelerometer of the type schematically shown in Fig. 3 employed as an inclinometer for determining the amount and direction of inclination of the reference axis 17 of the accelerometer or inclinometer about the axis of oscillation 15. In this embodiment of my invention, the acceleration-sensitive elements are mounted on arm 16, preferably as shown (see also Fig. 8) and are connected in a bridge circuit substantially in the same manner as shown in Fig. 3 and similar reference characters have been applied. In Fig. 7, however, I have shown one form of means for producing oscillation of the arm 16 about the axis 15 which comprises permanent magnet members 57 and 58 mounted respectively on opposite sides of the arm 16 which in this case is preferably formed of magnetic material, the permanent magnets having opposing pole faces of opposite polarity as indicated. Springs 59 serve as conducting means to connect the acceleration-sensitive elements in the bridge circuit and also to bias the arm 16 toward a central position in alignment with the reference axis 17. The oscillating means also comprises an amplifier 60 which supplies alternating current to the coils 61 and 62 mounted on arm 16. These coils are so wound that opposite or both ends of both of the permanent magnets function together to produce rotation of the arm or oscillation thereof in the same direction about the axis 15. A pickup winding 63 is preferably mounted on one of the permanent magnets such as magnet 57 to derive a voltage for controlling the frequency of the output of the amplifier, so that the acceleration-sensitive elements will be vibrated or oscillated at a predetermined frequency or substantially at the natural period of the system and the frequency of the output of amplifier 60 will tend to maintain this frequency.

For reasons above explained, the output of the bridge is supplied through transformer 161 to a filter 162 which rejects the double frequency voltage components supplied from the bridge but passes those which are of the same frequency as the frequency of oscillation of the sensitive elements. This fundamental frequency signal is a voltage having a phase sense dependent upon the direction of tilt of the reference axis 17 about the oscillation axis 15 and relative to apparent vertical and is of a magnitude dependent upon the extent of such tilt. Hence, for phase sensing purposes, I derive a reference voltage from the output of amplifier 60 and supply it by means of conductors 163 to a mixer or phase-sensitive amplifier or rectifier 64. The mixer circuit may be of the character of that illustrated in Fig. 13 which serves to supply a D. C. output having a polarity dependent upon the phase sense of the signal voltage supplied from the filter and having a magnitude proportional to the amplitude of said signal voltage. The output, of course, may be supplied to any desired form of utilization device such as a meter or servo motor mechanism or the like.

Figure 9:
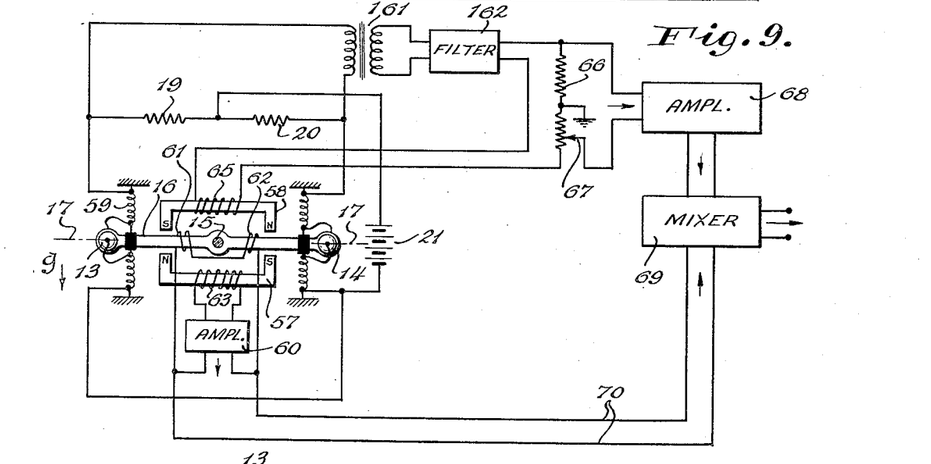
Fig. 9 schematically represents a modification of the system shown in Fig. 7 which is adapted to measure variations in the value of the gravitational acceleration.

In Fig. 9, I have illustrated a system generally similar to that shown in Fig. 7 and hereinabove described, but which is modified so as to provide an indication of variations in the value of $g$ or the acceleration due to gravity. This system comprises an oscillating arm supporting acceleration-sensitive elements on opposite sides of its axis of oscillation, and in this instance, the axis of oscillation 15 is horizontally disposed while the axis 17, to opposite sides of which the acceleration-sensitive elements are oscillated, is also disposed substantially horizontally. In this embodiment of my invention, I employ a winding 65 preferably disposed about permanent magnet 58 to obtain a voltage which is proportional to the amplitude of vibration of the arm 16, and this voltage is connected in bucking relation to the signal voltage of fundamental frequency derived from the filter 162. These voltages are applied in opposition across resistor 66 which is preferably connected to ground at a midpoint, and a balance of these voltages for a given value of $g$ may be achieved by adjusting the sliding contactor 67 engaging said resistor.

With the foregoing arrangement, any unbalance produced in the bridge at the frequency of oscillation of the acceleration-sensitive elements will be wholly proportional to the value of the acceleration due to gravity, and hence the amplitude thereof will be dependent upon the value of $g$. By bucking this signal voltage with a voltage of like amplitude and frequency, such as may be derived from winding 65, we may obtain zero voltage input to amplifier 68 for a given value of $g$. When, however, the actual value of $g$ varies, one or the other of said bucking voltages will predominate, resulting in the application of a signal voltage to amplifier 68 which has a phase sense depending upon whether the value of $g$ has increased or decreased. This signal voltage is supplied to a suitable mixer or phase-sensitive amplifier 69 to which a reference voltage is supplied from amplifier 60 through conductors 70 in the manner hereinbefore described in connection with Fig. 6. Therefore, the output of mixer 69 will be a voltage having an amplitude proportional to a change in the value of $g$ and a phase sense or a polarity which is dependent upon whether the value of $g$ has increased or decreased relative to some arbitrary, preselected value.

Figure 10:
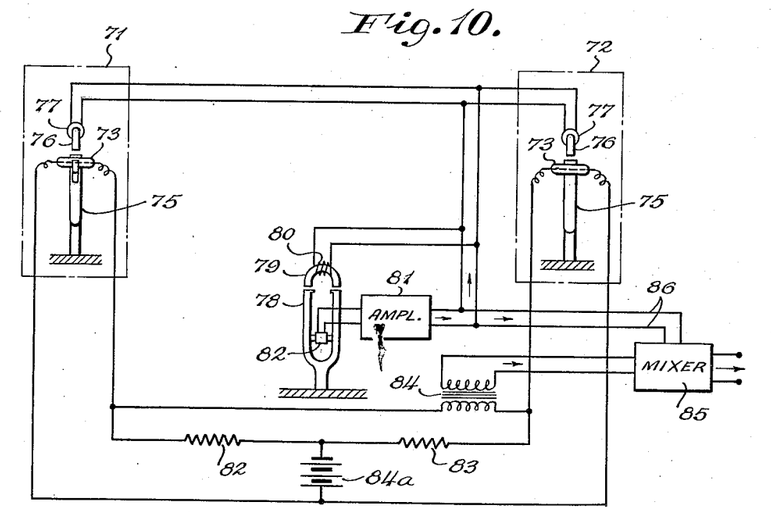
Fig. 10 schematically represents a modification of my accelerometer which is particularly adapted for measuring angular yaw accelerations.
Figures 11, 12, 13:
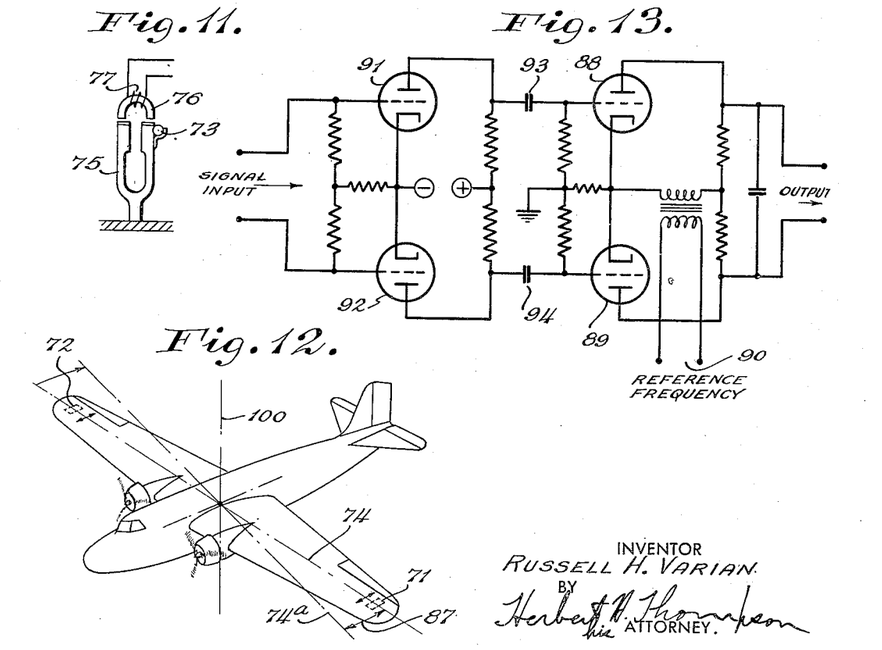
Fig. 11 is a schematic illustration of one of the acceleration-sensitive elements and its driver or vibrator viewed at right angles to the showing thereof in Fig. 10.
Fig. 12 illustrates a preferred disposition of the devices of Fig. 10 on an aircraft.
Fig. 13 is illustrative of one form of mixer circuit or phase-sensitive amplifier which may be employed in various of the embodiments of the invention hereindisclosed.

In Figs. 10-12, I have shown a modified form of my oscillatory, angular accelerometer which is particularly adapted for use on navigable craft for detecting yaw accelerations and for determining the magnitude and direction thereof. In this form of my invention, I propose to oscillate or vibrate two acceleration-sensitive elements, but in in-phase relation to each other as compared to the out or opposed phase oscillations described in connection with Figs. 3, 7 and 9. In other words, I propose to mount two acceleration-sensitive elements in relatively spaced relation on opposite sides of the axis about which the rotational acceleration is to be determined such as the yaw axis of the craft and vibrate these elements in the direction in which some component of the angular acceleration to be determined occurs, said acceleration-sensitive elements being vibrated or oscillated in synchronism but moving simultaneously in opposite directions with respect to said angular accelerations.

In the preferred disposition of the vibratory acceleration-sensitive elements shown in Fig. 12, which may serve for illustration purposes, one thereof is mounted preferably adjacent each wing tip as indicated generally at 71 and 72. These elements are preferably widely spaced since the sensitivity of this form of accelerometer is proportional to the distance therebetween.

Referring now to Fig. 10, the vibratory acceleration-sensitive elements are illustrated within the dash-line rectangles which respectively are designated with the reference numerals 71 and 72 to conform with the showing in Fig. 12. Each of the devices 71 and 72 comprises an acceleration-sensitive element 73 which may be of the character hereinbefore described and designated as 1, 2 or 13, 14 in Figs. 2 and 3. In the proposed embodiment of my invention for detecting angular accelerations in yaw, I cause the acceleration-sensitive elements of the devices 71 and 72 to be moved back and forth, oscillated or vibrated preferably in a direction normal to the axis joining the elements, such as the axis 74 in Fig. 12. In any event, the path of vibration coincides with the direction of a component of the angular acceleration to be detected. In comparison with the method of oscillating these acceleration-sensitive elements as described in connection with Figs. 3 and 7, the acceleration-sensitive elements 73 in the embodiment shown in Fig. 10 are vibrated in in-phase relation, that is, both are moved simultaneously in a fore and aft direction and therefore as one is moved in the direction in which the angular yaw acceleration force occurs, the other is moved in the opposite direction.

In the embodiment shown in Fig. 10, I propose to vibrate the acceleration-sensitive elements at the same frequency to experience equal accelerations by employing a pair of tuning forks, one for each acceleration-sensitive element and to control the vibration of these forks by a master tuning fork, so that they are continuously synchronized. In a system of this character, the master fork should have the highest frequency stability conveniently obtainable and the driven forks carrying the sensitive elements should have a very low Q. The letter "Q" is used to designate the ratio of the vibratory energy stored in the device to the energy lost by the device in one cycle. Also, it is desirable that the driven forks shall be nearly identical in all material respects, since it is important that these two forks be driven synchronously and in phase with each other. In the system shown, any phase shift which may occur between one of the driven forks and the master fork will be reproduced for the other driven fork and hence no phase shift will occur as between the two driven forks.

It is also desirable so to vibrate the acceleration-sensitive elements that the accelerations which they normally experience due to the vibratory motion thereof shall be larger than the largest accelerations to which the elements may be subjected, for example, gravity or linear motions of the aircraft. Otherwise, material changes in the sensitivity of the instrument will occur with changes in attitude of the aircraft relative to gravity.

In the embodiment shown in Fig. 10, the acceleration-sensitive devices are each mounted on a driven tuning fork 75, which is more clearly shown in Fig. 11, in any suitable manner, not shown. Each driven fork may be driven by means of a permanent magnet 76 which is further energized by a coil 77 to which alternating current is supplied, causing and controlling the tuning forks to vibrate at a frequency equal to that of said alternating current. A master tuning fork 78 is also provided with a permanent magnet exciter 79 provided with an exciting winding 80 which is energized from any suitable type of amplifier 81. As shown, the output of amplifier 81 serves to drive the master fork and the two driven forks. In the embodiment shown, a crystal pick-off 82 is mounted between the tines of the fork and connected in controlling relation to the amplifier 81 to control the frequency of its output and hence the frequency of vibration of the master tuning fork and also the driven forks.

The acceleration-sensitive elements 73 are connected in a balancing or bridge-like circuit including resistors 82 and 83 and battery 84a for energizing the circuit. The output of the bridge may be derived through transformer 84 and supplied to a mixer circuit or phase-sensitive amplifier 85. A reference voltage for phase sensing purposes may be derived from amplifier 81 and supplied by leads 86 to the mixer as shown.

The operation of the embodiment of my invention, last above described, is briefly as follows. Assuming that the devices 71 and 72 are mounted in relatively spaced relation adjacent opposite wing tips of an aircraft and that the acceleration-sensitive elements therein are vibrated in in-phase relation, no signal voltage output is derived from the bridge circuit while the craft pursues a forward course free from yawing because linear accelerations and the acceleration of gravity are balanced out in the bridge circuit. However, when movements in yaw occur in the direction represented by way of example by the arrow 87 in Fig. 12, axis 74 being rotated about the yaw axis 100 to a position 74a, the acceleration-sensitive element comprised in the device 71 will experience accelerations, due to its own vibratory movement, which are algebraically combined with the angular yaw acceleration. In other words, the vibratory accelerations of the device 71 will be alternately added to and subtracted from the yaw acceleration. At the same time and since the device 72 is vibrated in in-phase relation with the device 71, its vibratory accelerations will be alternately added to and subtracted from the yaw acceleration, but the sign thereof will be opposite for any given instant to that of the algebraic summation of accelerations to which the device 71 is responsive. Expressed in another way, since the devices 71 and 72 are vibrated in in-phase relation, a vibratory acceleration of the device 71 will be additive to the yaw acceleration when the vibratory acceleration of 72 is subtractive. Hence, a sinusoidal unbalance of the bridge will result when angular yaw accelerations occur and the amplitude of the bridge output will be a measure of the magnitude of the yaw acceleration and its phase sense will provide an indication of the direction of such yaw acceleration.

Although I have shown tuning forks as a means for producing vibratory movements of the acceleration-sensitive devices, it will be understood that any other suitable means may be provided synchronously to vibrate the two acceleration-sensitive elements in constantly in-phase relation. For example, solenoids or like electromagnetic devices may be used, the frequency of vibration of which may be controlled by currents supplied from a suitable source or amplifier.

Fig. 13 represents an exemplary form of mixer or phase-sensitive amplifier circuit which may be employed in the various embodiments of the present invention. By way of example, I have shown a two-stage, phase-sensitive rectifier, one stage thereof being used for phase detecting purposes and which may comprise thyratron tubes 88 and 89, the plates of which are energized in in-phase relationship from a source of reference voltage indicated generally at 90. The input stage comprises the electron tubes 91 and 92 which may be coupled to the phase detecting stage through suitable coupling condensers 93 and 94. When capacity coupling is employed, the amplifier is adapted for connection directly to the output of the bridge circuit to prevent a D. C. unbalance in the bridge from supplying a spurious signal output from the amplifier. Since this type of amplifier or phase-sensitive rectifier is fairly well known in the art, a further detailed discussion thereof is not necessary for a clear understanding of the present embodiments of my invention.

Although in the foregoing I have described the various embodiments of my invention in connection with particular uses thereof and in so doing I have set forth preferred dispositions of the acceleration-sensitive elements relative to space and described the planes of motion of the acceleration-sensitive devices relative to various acceleration components to be detected, it will be clearly understood that the acceleration-sensitive elements may be disposed in other relationships and arranged to detect other acceleration forces within the broad principles of my present invention and in accordance with the theory of operation thereof herein described. Hence, my invention in its broader aspects should be deemed to include all other relations of the acceleration-sensitive elements and any other manners of movement thereof which endow the accelerometers with sensitivity to particular acceleration forces and which function to produce outputs of the character and in like manner to those embodiments herein specifically described.

Hence, while I have described my invention in its preferred embodiments, it is to be understood that the words which I have used are words of description rather than of limitation and that changes within the purview of the appended claims may be made without departing from the true scope and spirit of my invention in its broader aspects.

What is claimed is:

1. In an acceleration-sensitive device adapted to be mounted on a navigable craft, two acceleration-sensitive means having like acceleration-sensitive properties and responsive to acceleration magnitudes, means for movably supporting said acceleration-sensitive means in relatively spaced positions and in fixed spaced relation to the axis about which an acceleration is to be detected, said acceleration-sensitive means being substantially symmetrically positioned with respect to said axis, means for balancing the responses of said acceleration-sensitive means under prescribed conditions of acceleration forces whereby an unbalance will result from a change in said acceleration conditions and means for continuously moving at least one of said elements in periodic fashion in the direction in which a component of an acceleration force to be detected will occur.

2. In an angular accelerometer of the gravity-biased type adapted to be mounted on a navigable craft, a pair of acceleration-sensitive means having like sensitivities and responsive to acceleration magnitudes, means for supporting said acceleration-sensitive means in relatively spaced positions and in such manner as to provide like sensitivity to acceleration forces to which they are subjected, said acceleration-sensitive means being substantially symmetrically positioned with respect to the axis about which angular accelerations are to be detected, means for vibrating said acceleration-sensitive means, means for balancing the responses of said acceleration-sensitive means when vibrating and under linear accelerations, and means for detecting the unbalance in the responses of said acceleration-sensitive means occasioned by angular accelerations of said supporting means.

3. In an accelerometer adapted to be mounted on a navigable craft, the combination with means including a pair of acceleration-sensitive elements connected in a balancing, bridge-like circuit adapted to provide a voltage output varying in accordance with changes in the value of acceleration forces to which said elements are subjected, of means for movably supporting said elements in relatively fixed, spaced relation to move about an axis but to move in the same and in opposite directions to the direction in which a component of an acceleration force to be detected will occur, and means for synchronously moving said elements in periodic fashion in said directions, said acceleration-sensitive elements being substantially symmetrically positioned with respect to said axis.

4. In an accelerometer adapted to be mounted on a navigable craft, the combination with means including a pair of acceleration-sensitive elements connected in a balancing, bridge-like circuit adapted to provide a voltage output varying in accordance with changes in the value of acceleration forces to which said elements are subjected, of means for supporting said elements in relatively fixed spaced relations and for movably supporting at least one of said elements to move in the same and in opposite directions to the direction in which a component of an acceleration force to be detected will occur, and means for moving said movably supported element in periodic fashion in said directions, said acceleration-sensitive elements being substantially symmetrically positioned with respect to the axis of the craft about which angular accelerations are to be detected.

5. In an accelerometer adapted to be mounted on a navigable craft, the combination with means including a pair of acceleration-sensitive elements connected in a balancing, bridge-like circuit adapted to provide a voltage output varying in accordance with changes in the value of acceleration forces to which said elements are subjected, of means for supporting said elements in relatively spaced relation and for rotation about an axis, said acceleration-sensitive elements being substantially symmetrically positioned with respect to said axis, and means for rotating said elements.

6. In an accelerometer adapted to be mounted on a navigable craft, the combination with means including a pair of acceleration-sensitive elements connected in a balancing, bridge-like circuit adapted to provide a voltage output varying in accordance with changes in the value of acceleration forces to which said elements are subjected, of means for supporting said elements in relatively spaced relation and for rotation about an axis, said acceleration-sensitive elements being substantially symmetrically positioned with respect to said axis, and means for continuously oscillating said elements in the direction of a component of an acceleration force to be detected.

7. In an accelerometer adapted to be mounted on a navigable craft, the combination with means including an acceleration-sensitive element adapted to provide a voltage output varying in accordance with changes in the value of acceleration forces to which it is subjected, of means for moving said sensitive element in the same and in an opposite direction to a component of an acceleration force to be detected, means for supplying a reference voltage having a frequency equal to the frequency of movement of said element, and means for comparing the phase relationship of the output of said first mentioned means with said reference voltage whereby the magnitude and direction of an acceleration component may be determined.

8. In an accelerometer, the combination with means including a pair of acceleration-sensitive elements connected in a balancing, bridge-like circuit adapted to provide a voltage output varying in accordance with changes in the value of acceleration forces to which said elements are subjected, of means for movably supporting said elements in relatively spaced substantially symmetrical relation to an axis of said craft and to move in the same and in opposite directions to the direction in which a component of an acceleration force to be detected will occur, means for moving said elements in periodic fashion in said directions in substantial synchronism, means for supplying a reference voltage having a frequency equal to the frequency of movement of said elements, and means for comparing the phase relationship of the output of said first mentioned means with said reference voltage whereby the magnitude and direction of an acceleration component may be determined.

9. In an accelerometer adapted to be mounted on a navigable craft, the combination with means including a pair of acceleration-sensitive elements connected in a balancing, bridge-like circuit adapted to provide a voltage output varying in accordance with changes in the value of acceleration forces to which said elements are subjected, of means for supporting said elements in relatively spaced relation to rotate about an axis extending generally vertically therebetween, said acceleration-sensitive elements being substantially symmetrically positioned with respect to said axis, driving means for continuously rotating said elements, means driven in synchronism with said driving means for supplying a reference voltage, and means for comparing the phase relationship of the output of said first mentioned means with said reference voltage whereby the magnitude and direction of an acceleration component may be determined.

10. In an accelerometer adapted to be mounted on a navigable craft and embodying an acceleration-sensitive element comprising a closed envelope enclosing a wire-like conductor having a high temperature coefficient of resistivity and a fluid exhibiting sufficient inertia as to appreciably vary the resistance of said conductor when subjected to acceleration forces, the combination with a balancing, bridge-like circuit having a pair of said sensitive elements connected therein and adapted to provide a signal voltage output varying in accordance with changes in the value of external acceleration forces to which said elements are subjected, of means for movably supporting said pair of elements in relatively fixed, spaced relation to move about an axis and to move in the same and in the opposite directions to the direction in which a component of an acceleration force to be detected will occur, said pair of elements being substantially symmetrically positioned with respect to said axis, and means for continuously moving said elements in periodic fashion in said directions.

11. In an accelerometer adapted to be mounted on a navigable craft and embodying an acceleration-sensitive element comprising a closed envelope enclosing a wire-like conductor having a high temperature coefficient of resistivity and a fluid exhibiting sufficient inertia as to appreciably vary the resistance of said conductor when subjected to acceleration forces, the combination with a balancing, bridge-like circuit having a pair of said sensitive elements connected therein and adapted to provide a signal voltage output varying in accordance with changes in the value of external acceleration forces to which said elements are subjected, of means for supporting said elements in relatively fixed, spaced relation, said acceleration-sensitive elements being substantially symmetrically positioned with respect to an axis of said craft, and means for vibrating at least one of said elements in the same and in an opposite direction to a component of an acceleration force to be detected.

12. In an accelerometer adapted to be mounted on a navigable craft and embodying an acceleration-sensitive element comprising a closed envelope enclosing a wire-like conductor having a high temperature coefficient of resistivity and a fluid exhibiting sufficient inertia as to appreciably vary the resistance of said conductor when subjected to acceleration forces, the combination with a balancing, bridge-like circuit having a pair of said sensitive elements connected therein and adapted to provide a signal voltage output varying in accordance with changes in the value of external acceleration forces to which said elements are subjected, of means for supporting said elements in relatively spaced relation and for rotation about an axis, said acceleration-sensitive elements being substantially symmetrically positioned with respect to said axis, means for rotating said elements, means for supplying a reference voltage having a frequency equal to the frequency of rotation of said elements, and means for comparing the phase relationship of the output voltage of said balancing circuit with said reference voltage whereby the magnitude and direction of an acceleration component may be determined.

13. In an accelerometer adapted to be mounted on a navigable craft and embodying an acceleration-sensitive element comprising a closed envelope enclosing a wire-like conductor having a high temperature coefficient of resistivity and a fluid exhibiting sufficient inertia as to appreciably vary the resistance of said conductor when subjected to acceleration forces, the combination with a balancing, bridge-like circuit having a pair of said sensitive elements connected therein and adapted to provide a signal voltage output varying in accordance with changes in the value of external acceleration forces to which said elements are subjected, of means for supporting said elements in relatively spaced relation and for rotation about an axis, said acceleration-sensitive elements being substantially symmetrically positioned with respect to said axis, means for continuously oscillating said elements about said axis of rotation, means for supplying a reference voltage having a frequency equal to the frequency of oscillation of said elements, and means for comparing the phase relationship of the output voltage of said balancing circuit with said reference voltage.

14. An accelerometer of the character recited in claim 8, together with means connected with the output of said balancing circuit for passing signal voltage components of the frequency of oscillation of said elements but filtering out components of other frequencies.

15. In an accelerometer adapted to be mounted on a navigable craft and embodying an acceleration-sensitive element comprising a closed envelope enclosing a wire-like conductor having a high temperature coefficient of resistivity and a fluid exhibiting sufficient inertia as to appreciably vary the resistance of said conductor when subjected to acceleration forces, the combination with a balancing, bridge-like circuit having a pair of said sensitive elements connected therein and adapted to provide a signal voltage output varying in accordance with changes in the value of external acceleration forces to which said elements are subjected, of means for supporting said elements in relatively spaced relation and for rotation about a generally horizontally extending axis therebetween, said acceleration-sensitive elements being substantially symmetrically positioned with respect to said axis, means for rotating said elements, means for supplying a voltage equal to the output signal voltage of said balancing circuit and of the same frequency, and means for differentially combining said voltages.

16. In an accelerometer adapted to be mounted on a navigable craft and embodying an acceleration-sensitive element comprising a closed envelope enclosing a wire-like conductor having a high temperature coefficient of resistivity and a fluid exhibiting sufficient inertia as to appreciably vary the resistance of said conductor when subjected to acceleration forces, the combination with a balancing, bridge-like circuit having a pair of said sensitive elements connected therein and adapted to provide a signal voltage output varying in accordance with changes in the value of external acceleration forces to which said elements are subjected, of means for supporting said elements in relatively spaced relation and for rotation about a generally horizontally extending axis, said acceleration-sensitive elements being substantially symmetrically positioned with respect to said axis, means for rotating said elements, means for supplying a voltage equal to the output signal voltage of said balancing circuit and of the same frequency, means for differentially combining said voltages, means for supplying a reference voltage having a frequency equal to the frequency of rotation of said elements, and means for comparing the phase relationship of the differential voltage with said reference voltage whereby a change in magnitude of the gravitational acceleration force and the algebraic sign of said change may be determined.

17. In an accelerometer adapted to be mounted on a navigable craft, the combination with means including a pair of acceleration-sensitive elements connected in a balancing, bridge-like circuit adapted to provide a voltage output varying in accordance with changes in the value of acceleration forces to which said elements are subjected, of means for supporting said elements in relatively spaced relation and substantially symmetrically with respect to an axis about which angular acceleration forces are to be detected, and means for vibrating said elements back and forth simultaneously in the same directions of movement in in-phase fashion and in the direction in which a component of said angular acceleration forces occurs.

18. In an accelerometer adapted to be mounted on a navigable craft, the combination with means including a pair of acceleration-sensitive elements connected in a balancing, bridge-like circuit adapted to provide a voltage output varying in accordance with changes in the value of acceleration forces to which said elements are subjected, of means for supporting said elements in relatively spaced relation and substantially symmetrically with respect to an axis about which angular acceleration forces are to be detected, means for vibrating said elements back and forth simultaneously in the same directions of movement in in-phase fashion and in the direction in which a component of said angular acceleration forces occurs, means for supplying a reference voltage having a frequency equal to the frequency of vibration of said elements, and means for comparing the phase relationship of the output voltage of said bridge-like circuit with said reference voltage.

19. In an accelerometer adapted to be mounted on a navigable craft and embodying an acceleration-sensitive element comprising a closed envelope enclosing a wire-like conductor having a high temperature coefficient of resistivity and a fluid exhibiting sufficient inertia as to appreciably vary the resistance of said conductor when subjected to acceleration forces, the combination with a balancing, bridge-like circuit having a pair of said sensitive elements connected therein and adapted to provide a signal voltage output varying in accordance with changes in the value of external acceleration forces to which said elements are subjected, of means for supporting said elements in relatively spaced relation and substantially symmetrically with respect to an axis about which angular acceleration forces are to be detected, a pair of electrical means for vibrating said elements at the frequency of the current supplied thereto, an amplifier for supplying current to said electrical vibrating means, said electrical means being connected to produce synchronous vibration of said elements in simultaneously the same directions and said elements being supported to vibrate in the direction in which a component of said angular acceleration forces occurs, and means for comparing the phase relationship of the output voltage of said balancing circuit with the output voltage of said amplifier.

20. In an accelerometer adapted to be mounted on a navigable craft and embodying an acceleratin-sensitive element comprising a closed envelope enclosing a wire-like conductor having a high temperature coefficient of resistivity and a fluid exhibiting sufficient inertia as to appreciably vary the resistance of said conductor when subjected to acceleration forces, the combination with a balancing, bridge-like circuit having a pair of said sensitive elements connected therein and adapted to provide a signal voltage output varying in accordance with changes in the value of external acceleration forces to which said elements are subjected, of a gyro vertical having a rotor-bearing case and a rotor therein adapted to rotate about a spin axis, means for supporting said elements in spaced, substantially symmetrical relation to the spin axis of said gyro and for imparting rotation thereto about said axis, means for supplying a reference voltage of a frequency equal to the spin frequency of said elements, and means for exerting an erecting torque about an axis of support of said rotor-bearing case including means for comparing the phase relationship of the output voltage of said balancing circuit with said reference voltage whereby to produce a torque in the correct direction to precess the gyro spin axis toward vertical.

21. In an accelerometer adapted to be mounted on a navigable craft, the combination with means including an acceleration-sensitive element adapted to provide a voltage output varying in accordance with changes in value of acceleration forces to which it is subjected, of means for rotating said sensitive element about an axis to move it in the same and in an opposite direction to the component of an acceleration force to be detected, means for supplying a reference voltage having a frequency equal to the frequency of movement of said element, and means for comparing the phase relationship of the output of said first mentioned means with said reference voltage whereby the magnitude and direction of an acceleration component may be determined.

22. In an accelerometer adapted to be mounted on a navigable craft, the combination with means including an acceleration-sensitive element adapted to provide a voltage output varying in accordance with changes in value of acceleration forces to which it is subjected, of means for oscillating said sensitive element in the direction of a component of an acceleration force to be detected, means for supplying a reference voltage having a frequency equal to the frequency of movement of said element, and means for comparing the phase relationship of the output of said first mentioned means with said reference voltage whereby the magnitude and direction of an acceleration component may be determined.

RUSSELL H. VARIAN.

REFERENCES CITED

The following references are of record in the file of this patent:

UNITED STATES PATENTS

| Number | Name | Date |
| --- | --- | --- |
| 1,841,607 | Kollsman | Jan. 19, 1932 |
| 2,155,419 | Gunn | Apr. 25, 1939 |
| 2,193,910 | Wilson | Mar. 19, 1940 |
| 2,266,449 | Ullrich | Dec. 16, 1941 |
| 2,338,732 | Nosker | Jan. 11, 1944 |
| 2,351,977 | Kronenberger | June 20, 1944 |
| 2,377,212 | Cottrell | May 29, 1945 |
| 2,392,293 | Ruge | Jan. 1, 1946 |

FOREIGN PATENTS

| Number | Country | Date |
| --- | --- | --- |
| 289,862 | Great Britain | Aug. 6, 1929 |
| 719,762 | France | Feb. 10, 1932 |